United States Patent [19]

McMath

[11] Patent Number: 5,632,405
[45] Date of Patent: May 27, 1997

[54] CONTAINER FOR LOBSTERS AND THE LIKE

[75] Inventor: Graham McMath, Tynemouth, England

[73] Assignee: Dynoplast Limited, Clwyd, Wales

[21] Appl. No.: 397,575

[22] Filed: Mar. 2, 1995

[30] Foreign Application Priority Data

Mar. 14, 1994 [GB] United Kingdom ............... 9404880

[51] Int. Cl.⁶ .................. A01K 97/00; A01K 97/20; B65D 1/22; B65D 43/16
[52] U.S. Cl. .................. 220/560; 220/216; 220/676; 43/55
[58] Field of Search ................... 220/676, 560, 220/216; 43/54.1, 55, 56, 100, 103

[56] References Cited

U.S. PATENT DOCUMENTS

| | | | |
|---|---|---|---|
| 3,717,124 | 2/1973 | Jacobs | 43/55 X |
| 3,754,348 | 8/1973 | Ramsey | 43/103 |
| 4,648,199 | 3/1987 | Deaton et al. | 43/100 |
| 4,648,200 | 3/1987 | Miller et al. | 43/100 X |
| 4,671,008 | 6/1987 | Lindehood | 43/54.1 |
| 4,870,778 | 10/1989 | Sheppard | 43/55 |
| 4,905,404 | 3/1990 | Pasion et al. | 43/54.1 X |
| 4,927,041 | 5/1990 | Hepburn | 43/54.1 X |
| 4,996,790 | 3/1991 | Ruggles | 43/54.1 X |

FOREIGN PATENT DOCUMENTS 2248607  4/1992  United Kingdom .............. 43/55

*Primary Examiner*—Sue A. Weaver
*Attorney, Agent, or Firm*—Rodman & Rodman

[57] ABSTRACT

A container which is suitable for retaining lobsters and similar catches in a live condition comprises a container body and a lid which can be secured in place to close the container body, both the body and lid being of synthetic polymeric material(s). The lid has one or more sealed chambers in it which are of sufficient total capacity to render the lidded container buoyant when full. Thus the catch of lobsters or the like may be retained in a live condition and secure against escape while the container is floated, for example alongside a fishing boat or fish quay.

11 Claims, 2 Drawing Sheets

CONTAINER FOR LOBSTERS AND THE LIKE

BACKGROUND OF THE INVENTION

The present invention is concerned with containers such as may be used in the fishing industry for retaining lobsters and similar catches in a live condition during transit and/or storage. The containers may be used for retaining similar products, not necessarily in a live condition, but will be described herein as exemplified by their use for live lobsters.

In the lobster fishing industry, boxes for containing live lobsters are conventionally made of wood and may therefore be floated alongside the fishing boat or in a storage area, for example alongside a fish quay, with water free to circulate into and from the box and thus to keep the lobsters therein alive and fresh. Throughout the fishing industry in general, there has been a steady trend of fashioning fish boxes from synthetic polymeric materials. Such materials have considerable advantages, for example they are readily cleaned and kept in a clean condition and they may be lighter in weight than a corresponding conventional wooden box, but heretofore no such plastics fish box has been available which is suitable for lobsters. Although the plastics material itself may be buoyant, it is unable to float when the box is even partly filled with lobsters or another catch.

OBJECT AND SUMMARY OF THE INVENTION

It is an object of the present invention to provide a container which combines the respective relevant advantages of plastics materials and wood.

The container according to the present invention is formed of a synthetic polymeric material and has a lid which is also of a synthetic polymeric material, which can be secured to close the container and has one or more sealed chambers therein which are of sufficient total capacity to render the lidded container buoyant when filled with lobsters, for example.

The container and its lid are preferably formed of the same polymeric material, among which materials high-density polyethylene is preferred.

The lid may be wholly separable from the container or may be formed integral therewith or otherwise designed so as normally to remain attached to the container. In a preferred form of the invention, the lid is formed with one or more projections adapted to engage corresponding sockets in the container when the lid is to be attached thereto. By suitable shaping of such projections and sockets, they may form hinges connecting one edge of the lid to the container.

Because the sealed chamber or chambers within the lid, which will normally be filled with air, are intended to give buoyancy to the filled container to enable the container to be stored floating, the chamber or chambers are preferably symmetrically disposed across the area of the lid. For example a sealed chamber may be formed at the centre of that area or peripherally with respect to the lid area. In a preferred form of the invention, two sealed chambers are provided, one at the centre of the lid and the other surrounding the first chamber.

Particularly when the container is to be used for storing live lobsters or the like, the walls of the container preferably have apertures therethrough to permit circulation of water into and from the container.

DESCRIPTION OF THE DRAWINGS

The invention will now be further described with reference to the accompanying drawings, which illustrate, by way of example only, one preferred embodiment of the lidded container according to the present invention and wherein.

DETAILED DESCRIPTION OF THE INVENTION

Figure 1:
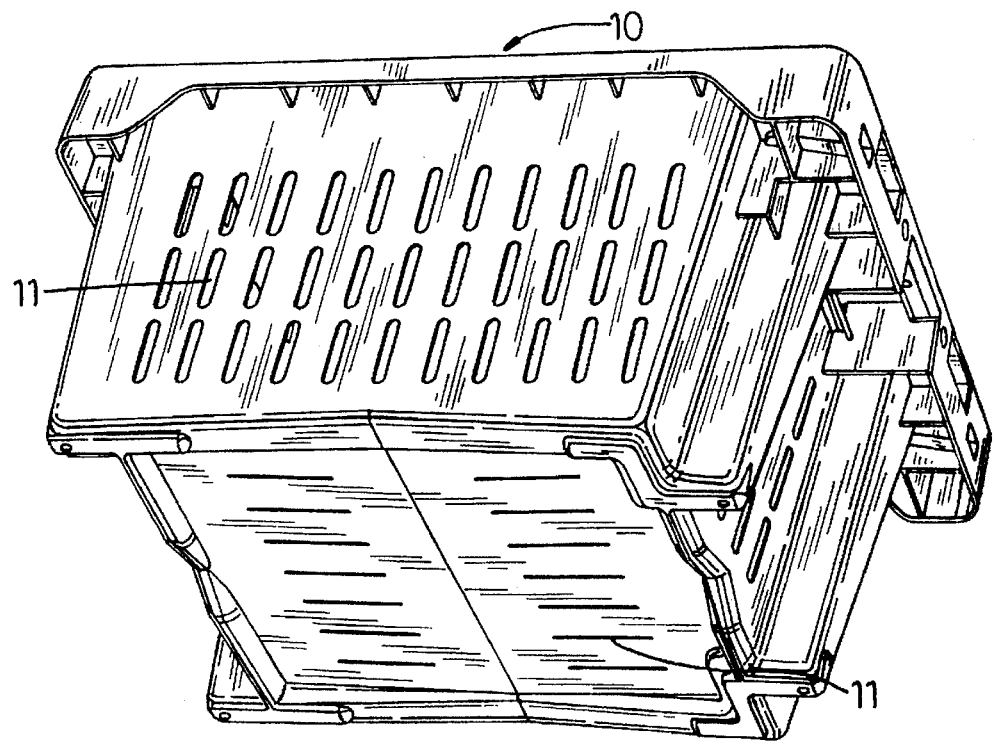
FIG. 1 is a perspective view of the body of the container from below.
Figure 2:
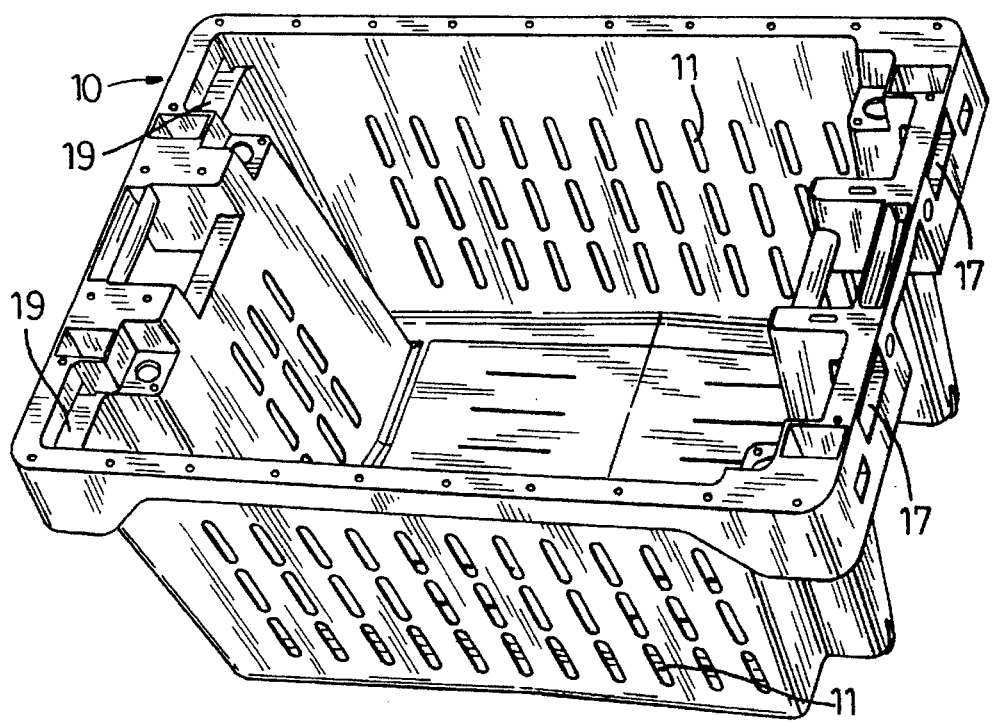
FIG. 2 is a perspective view of the body of the container from above.
Figure 3:
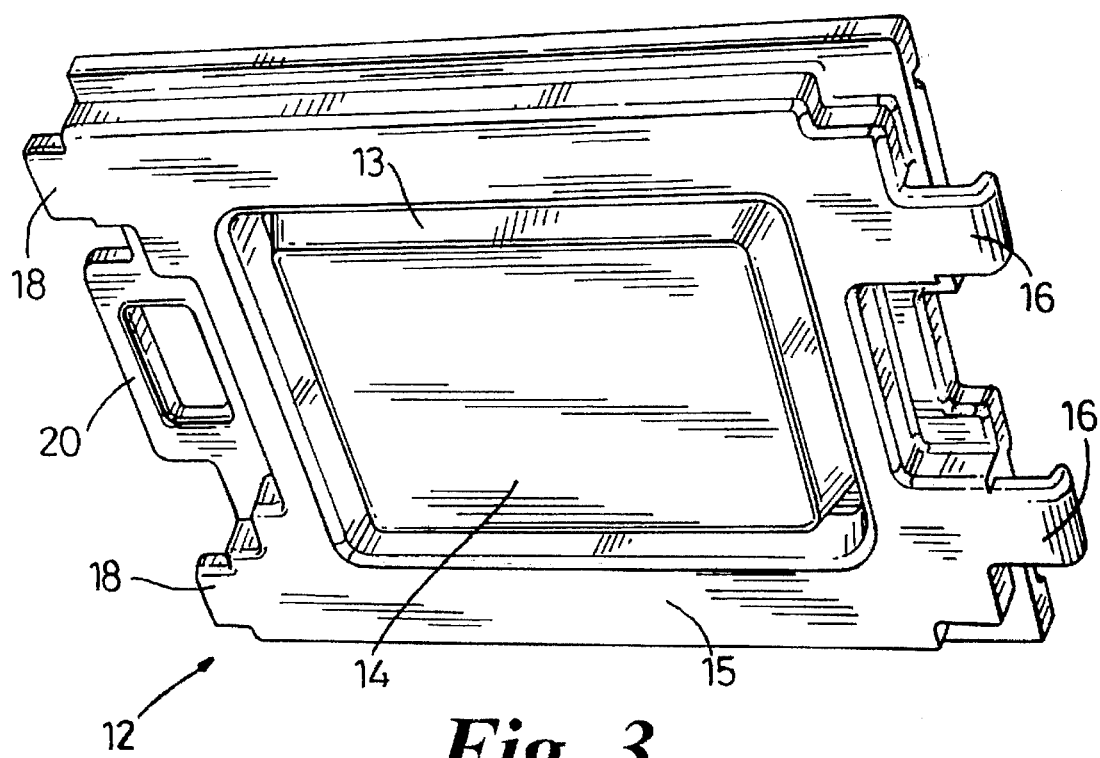
FIG. 3 is a perspective view of the lid from below.
Figure 4:
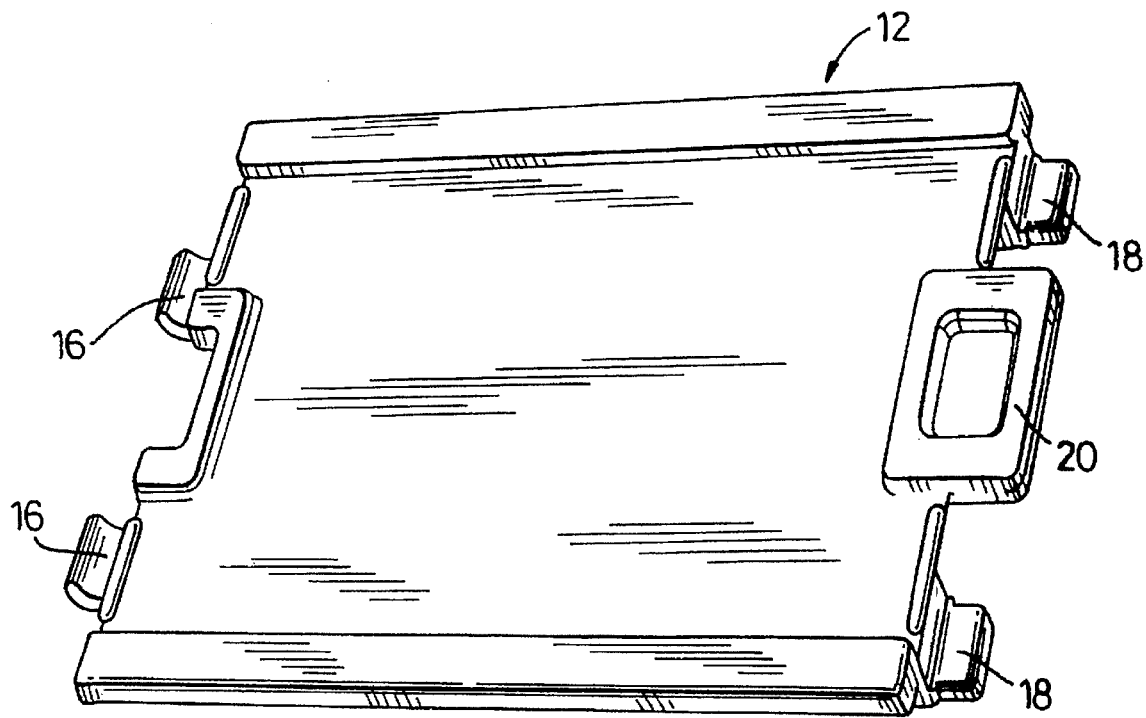
FIG. 4 is a perspective view of the lid from above.

The illustrated container body 10 is formed as a unitary moulding in high-density polyethylene and is designed to nest in a similar container when the two containers are similarly orientated and to stack upon a similar container when the respective containers are relatively turned through 180° about a vertical axis. The container body 10 tapers somewhat in a downward direction and both the base of the container and its upright walls are perforated by slots 11 to allow water to circulate and to drain from the container.

The lid 12, also of high-density polyethylene, is hollow and, by sealing the inner surfaces of the lid together along a channel 13 during the moulding of the lid, the hollow interior is divided into a generally rectangular central sealed chamber 14 and an annular sealed chamber 15 surrounding the central chamber.

The lid is formed with a pair of curved projections 16 at one end thereof and these projections are adapted to engage sockets 17 in one of the end walls of the container body 10 to form a pair of hinges connecting the lid 12 to the body of the container. Flat projections 18 at the opposite end of the lid engage shoulders 19 in the container body.

When the container has been filled with live lobsters, a handle 20 between the projections 18 is tied or otherwise secured to the container, to retain the lid securely in position. The closed lid not only prevents the live lobsters from escaping from the container but also affords the closed container sufficient buoyancy to allow it to be floated.

I claim:

1. A lidded container for aquatic life including lobsters, comprising a container body formed of a synthetic polymeric material and a lid also formed of a synthetic polymeric material, which lid is adapted to be secured to the container to close the container and which lid further has at least one buoyant sealed chamber, the total capacity of said sealed chamber or chambers being sufficient to render said lidded container buoyant when filled with aquatic beings including lobsters.

2. A lidded container according to claim 1, wherein said container body and said lid are of the same polymeric material.

3. A lidded container according to claim 2, wherein said polymeric material is high-density polyethylene.

4. A lidded container for aquatic life including lobsters comprising, a container body formed of a synthetic polymeric material and a lid also formed of a synthetic polymeric material, said container body having at least one socket therein and said lid having at least one projection thereon, which projection is adapted to engage said socket, whereby to attach said lid to said container body, said lid further having at least one sealed chamber therein whereby to impart buoyancy to said lid and container body together.

5. A lidded container according to claim 4, wherein said projection and said socket together form a hinge connecting an edge of said lid to said container body.

6. A lidded container according to claim 5, wherein said container body and said lid are both formed of high-density polyethylene.

7. A lidded container according to claim 6, wherein said container body has a plurality of apertures extending therethrough.

8. A lidded container comprising, a container body having a base and four walls extending upwardly from said base, and a lid for securement to said container body to close said container body, each of said container body and said lid being formed of a synthetic polymeric material, said lid having at least one sealed chamber therein, symmetrically disposed relative to the area of said lid, the total capacity of said at least one sealed chamber being sufficient to permit said lidded container to float upon water when said container is fully filled with aquatic beings.

9. A lidded container according to claim 8, wherein said one sealed chamber is within the region of the centre of the area of said lid and a second sealed chamber extends around said one sealed chamber.

10. A lidded container according to claim 9, wherein said container body and said lid are both formed of high-density polyethylene.

11. A lidded container according to claim 9, having apertures extending through said walls of said container body.

* * * * *